US011605939B2

(12) United States Patent
Drane et al.

(10) Patent No.: US 11,605,939 B2
(45) Date of Patent: Mar. 14, 2023

(54) CONDUIT ASSEMBLY PROVIDING A THERMAL BREAK THROUGH AN OPENING IN AN INSULATED PANEL

(71) Applicant: ABB INSTALLATION PRODUCTS INTERNATIONAL LLC, Cary, NC (US)

(72) Inventors: Mark R. Drane, Collierville, TN (US); Stephen V. Norako, Oakland, TN (US); Darren Tremelling, Apex, NC (US); Peter Schuster, Uster (CH)

(73) Assignee: ABB INSTALLATION PRODUCTS INTERNATIONAL LLC, Cary, NC (US)

( * ) Notice: Subject to any disclaimer, the term of this patent is extended or adjusted under 35 U.S.C. 154(b) by 215 days.

(21) Appl. No.: 16/781,448

(22) Filed: Feb. 4, 2020

(65) Prior Publication Data
US 2020/0303914 A1    Sep. 24, 2020

Related U.S. Application Data

(63) Continuation of application No. PCT/US2018/044782, filed on Aug. 1, 2018.

(60) Provisional application No. 62/541,185, filed on Aug. 4, 2017.

(51) Int. Cl.
*H02G 3/22* (2006.01)
*H02G 15/013* (2006.01)

(52) U.S. Cl.
CPC ............. *H02G 3/22* (2013.01); *H02G 15/013* (2013.01)

(58) Field of Classification Search
CPC ........ H02G 15/013; H02G 3/26; H02G 3/185; H02G 3/088; H02G 3/06; H02G 3/22–288; H02G 15/06–196
See application file for complete search history.

(56) References Cited

U.S. PATENT DOCUMENTS

| 3,992,044 | A | * | 11/1976 | Muslin | F16L 33/01 174/652 |
|---|---|---|---|---|---|
| 4,180,297 | A | | 12/1979 | Abrams | |
| 4,264,779 | A | | 4/1981 | Rhodes et al. | |
| 4,336,416 | A | | 6/1982 | Goodsell | |
| 4,477,694 | A | | 10/1984 | Kohaut | |
| 4,573,297 | A | | 3/1986 | Benscoter et al. | |
| 5,560,397 | A | | 10/1996 | Miller et al. | |

(Continued)

FOREIGN PATENT DOCUMENTS

| DE | 10054419 | 5/2002 |
|---|---|---|
| WO | 199625782 | 8/1996 |
| WO | 2009000778 | 12/2008 |

OTHER PUBLICATIONS

Search Report and Written Opinion, PCT Appln. No. PCT/US2018/044782, 17 pgs, dated Feb. 28, 2019.

*Primary Examiner* — Roshn K Varghese
(74) *Attorney, Agent, or Firm* — Greenberg Traurig, LLP

(57) ABSTRACT

A conduit assembly provides a thermal break about an opening in an insulated panel. An elongate conduit extends through an opening in the panel. The conduit has an interior for passage of wires and an exterior. An electrical enclosure is mounted to one end of the conduit on one side of the panel. The conduit and the box being in communication for passage of the wires into the enclosure. A panel seal is provided for sealing the opening in the panel about the conduit.

18 Claims, 8 Drawing Sheets

(56) References Cited

U.S. PATENT DOCUMENTS

| | | | |
|---|---|---|---|
| 5,596,176 A * | 1/1997 | Everitt | H02G 3/22 |
| | | | 174/151 |
| 5,696,349 A | 12/1997 | Bera | |
| 6,018,126 A | 1/2000 | Castellani et al. | |
| 6,018,918 A | 2/2000 | Long, Sr. | |
| 6,698,146 B2 | 3/2004 | Morgan et al. | |
| 7,152,385 B2 | 12/2006 | Morgan et al. | |
| 7,442,883 B2 | 10/2008 | Jolly et al. | |
| 8,087,674 B2 | 1/2012 | Cummings | |
| 8,156,700 B2 | 4/2012 | Umlor | |
| 8,393,121 B2 | 3/2013 | Beele | |
| 8,490,353 B2 | 7/2013 | Beele | |
| 8,833,014 B2 | 9/2014 | Beele | |
| 8,905,697 B2 | 12/2014 | Gong et al. | |
| 2009/0133357 A1 | 5/2009 | Richards | |
| 2015/0047276 A1 | 2/2015 | Gandolfo et al. | |

\* cited by examiner

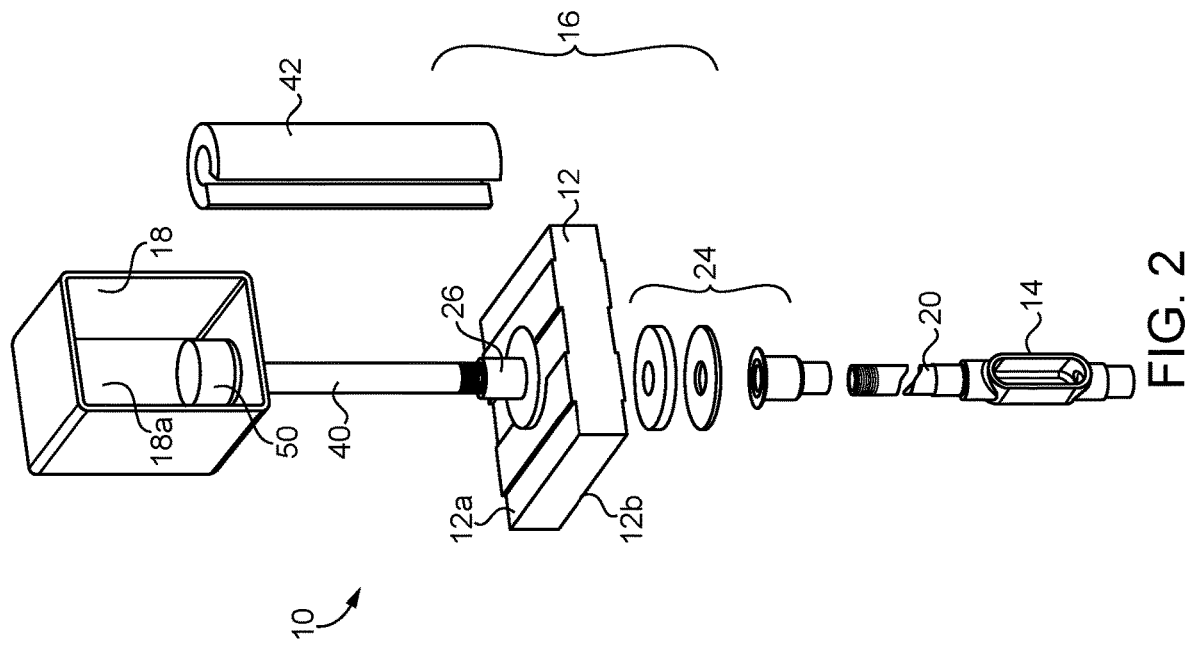
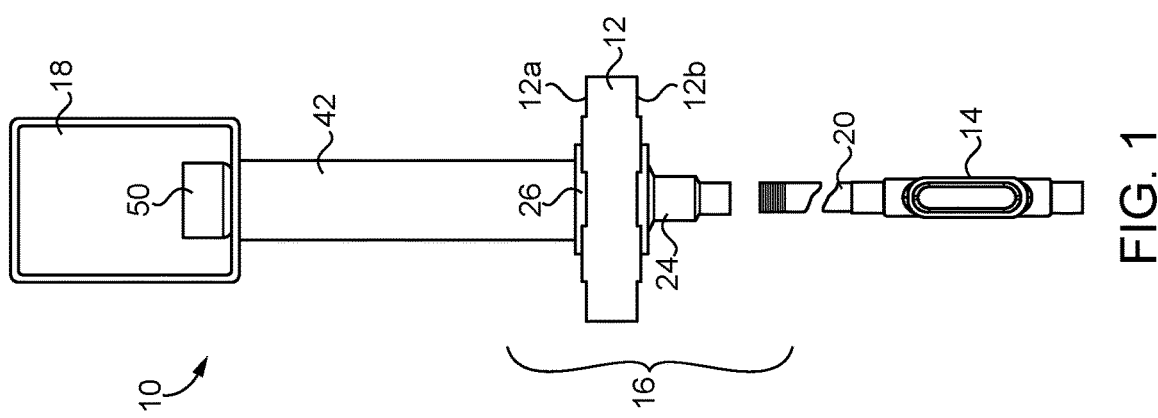

CONDUIT ASSEMBLY PROVIDING A THERMAL BREAK THROUGH AN OPENING IN AN INSULATED PANEL

CROSS REFERENCE TO RELATED APPLICATION

This application claims priority to U.S. Provisional Patent Application No. 62/541,185, filed on Aug. 4, 2017, the contents of which are incorporated herein by reference in its entirety.

FIELD OF THE INVENTION

The present invention relates generally to a conduit assembly for allowing passage of wires and/or cables through an opening in an insulated panel. More particularly, the present invention relates to a conduit assembly for providing a thermal break about an opening in an insulated panel.

BACKGROUND OF THE INVENTION

In certain industries such as the food and beverage industry, the processing plants must be kept at a temperature below ambient. Quite typically, these temperatures are below 40° F. These processing areas are generally constructed of insulated walls and ceilings using an insulated metal panel. The temperature on the outside of the processing area is typically ambient temperature which can be at a temperature of 70° F. or above.

Electrical conduit which supports electrical wires and/or cables that carries power to these processing areas must penetrate the insulated panel of the ceiling or wall. As a result of the conduit passing through the insulated panel and the temperature difference on either side of the panel, the conduit is susceptible to condensation both inside and outside of the conduit. Such condensation may be detrimental to the electrical components housed on the processing side of the insulated panel. Also, thermal conductivity through the panel may be detrimental.

Prior attempts to provide a thermal break at the insulated metal panel have included placing foam sealant about the conduit within the opening. However, this practice is not generally acceptable in the trod and beverage industry.

SUMMARY OF THE INVENTION

The present invention provides a conduit assembly which provides a thermal break about an opening in an insulated panel through which the conduit assembly extends. The conduit assembly includes an elongate conduit extending through the opening in the panel. The conduit has an interior for passage of wires therethrough and a conduit exterior.

An electrical enclosure is mounted to one end of the conduit on one side of the panel. The conduit and the enclosure are in communication for passage of wires therethrough. A panel seal is provided tier sealing the opening in the panel about the conduit.

The present invention further provides a fill cup supported in the electrical enclosure about the opening in communication with the conduit. The fill cup accommodates passage of wires therethrough. A thermal sealant is injectable into the fill cup to surround the wires and extend into the conduit interior adjacent the fill cup.

A conduit insulator is disposed about the conduit.

According to another embodiment of the present invention, a conduit assembly for providing a thermal break about an opening in an insulated panel includes an elongate conduit extending through the opening in the panel, a conduit fitting having a conduit fitting interior, and a panel seal attachable to and supported by the conduit for scaling the opening in the panel about the conduit. The conduit has a conduit interior for passage of wires and an exterior. The conduit fitting is mounted to one end of the conduit on one side of the panel, and the conduit and the conduit fitting are in communication for passage of the wires into the ends.

BRIEF DESCRIPTION OF THE DRAWINGS

FIG. 1 is a front plan view of the thermal break conduit assembly of the present invention, FIG. 2 is an exploded perspective view of the conduit assembly of FIG. 1.

DETAILED DESCRIPTION OF THE PREFERRED EMBODIMENTS

Figure 4:
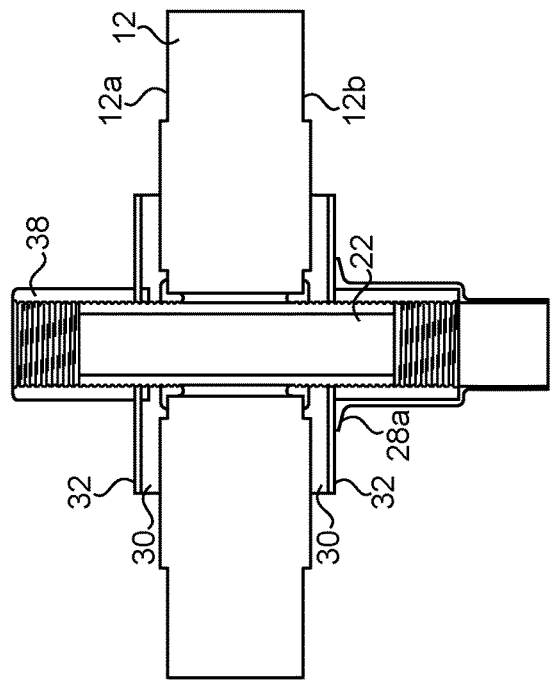
FIG. 4 is a cross-sectional showing of the panel seals of FIG. 3.

The present invention is directed to a conduit assembly for providing a thermal break about an opening in an insulated panel which allows wires and cables (hereinafter "wires") to be passed therethrough. The invention will be described herein with reference to the drawings which show embodiments of the present invention. It is understood that the components described herein need not be assembled in the particular order shown nor would it be necessary for all the components to be used in tandem to achieve the desired results.

With reference to FIGS. 1 and 2, the conduit assembly 10 of the present invention is shown. Conduit assembly 10 includes a number of connected components which are designed to pass wires through an insulated metal panel (IMP) 12. In the food and beverage industry, it is necessary to keep the processing plant at a temperature well below ambient temperature. These processing areas are typically constructed of insulated walls and ceilings using an insulated metal panel (IMP) to separate the processing plant from ambient temperature.

The IMP 12 has a first surface 12a on the ambient side and a second surface 12b on the processing side. An opening 13 through the IMP 12 allows passage of the conduit assembly 10 as well as the wires 11 (FIG. 7) therethrough. The description of the conduit assembly 10 of the present invention will be made for convenience from bottom to top as viewed in FIGS. 1 and 2 where the bottom of the conduit assembly is on the processing side of the IMP 12 and the top of the conduit assembly 10 is on the ambient side of the IMP 12.

Conduit assembly 10 includes a conduit body 14 which as conventionally known accommodates electrical wires and connections therein. While a conduit body 14 is shown, it may be appreciated that any conventional wire management component may be used.

Attached and extending upwardly from conduit body 14 is an elongate electrical conduit 16. Conduit 16 extends from conduit body 14 on the processing side to an electrical enclosure 18 on the ambient side of the IMP 12 as will be described in further detail hereinbelow. Conduit 16 is a conventional electrical conduit which may be formed of a wide variety of materials well known in the electrical connection art. The conduit 16 is comprised of several components as will be further described.

Figure 5:
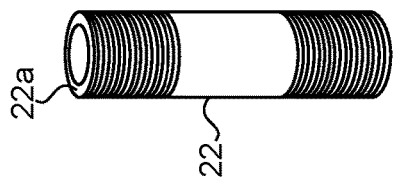
FIG. 5 is a perspective showing of a clamp nipple used in the conduit assembly of FIG. 1.

Conduit 16 is typically made up of a conduit run 20 on the processing side of IMP 12 and is attached to and in communication with an elongate clamp nipple 22 shown in more detail in FIG. 5. The clamp nipple 22 is externally threaded at each end and is designed to extend through the opening 13 of the IMP 12. Clamp nipple 22 may be formed of any conventional material used for a conduit, but in the present illustrative embodiment it may be preferable to form clamp nipple 22 of a nonmetallic material which has a lower degree of thermal conductivity. Mourned on each side of opening 13 of IMP 12 and attached to the clamp nipple 22 are first and second panel seal assemblies 24 and 26.

Figure 3:
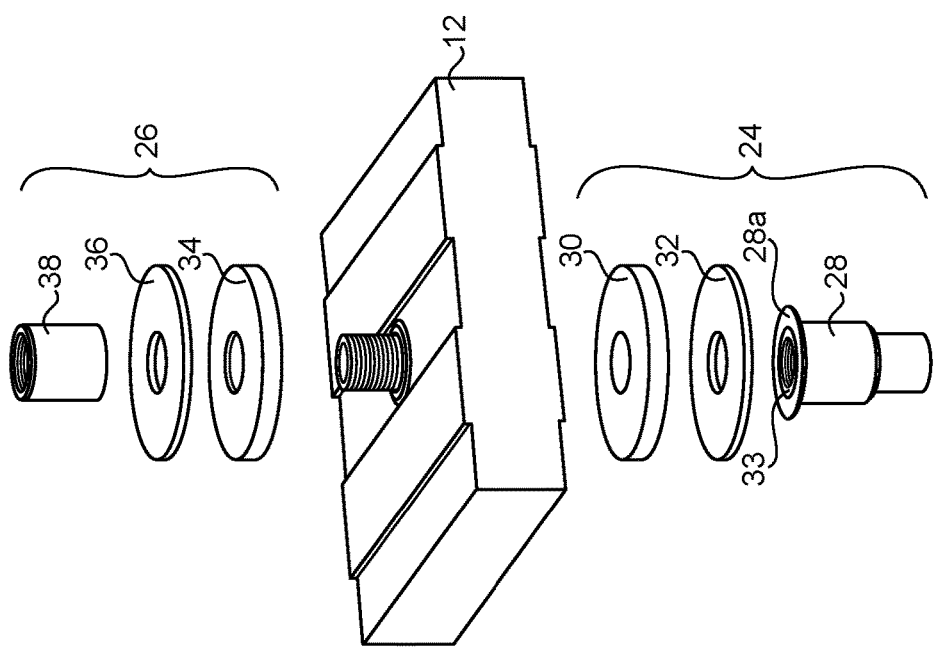
FIG. 3 is an exploded perspective view of panel seals which is part of the conduit assembly of FIG. 1.

Referring in more detail to FIGS. 3-5, panel seal 24 which is similar to panel seal 26 includes a pipe coupling 28, which is generally a tubular member having a flat annularly outwardly extending upper surface 28a. Pipe coupling 28 accommodates the upper end of conduit run 20. Panel seal assembly 24 further includes a sealing washer 30 which may be typically formed of silicone rubber and a backup washer 32. The sealing washer has a thickness and durometer to allow for a fixed amount of movement in the axial direction of the conduit. This accommodates any inherent deflection in the IMP. The backup washer 32 supports the sealing washer 30 against the IMP 12. The pipe coupling 28 attaches the sealing washer 30 and the backup washer 32 to the lower surface 12b of IMP 12 about opening 13. The pipe coupling 28 supports therein an elongate internally threaded nut 33. Nut 33 is attached to conduit run 20 and clamp nipple 22 to secure the components together and to also secure or clamp the sealing assembly 24 to the IMP 12. Sufficient compression is maintained to create a seal with the silicone rubber washer 30 about the opening 13.

Likewise, on the ambient side, panel seal assembly 26 includes a sealing washer 34 as described above and a backup washer 36. A conduit coupling nut 38 is employed to connect clamp nipple 22 to box nipple 40 as will be discussed hereinbelow. The coupling nut 38 also helps secure and clamp the sealing assembly 26 to the IMP 12.

Referring back to FIGS. 1 and 2, extending from the upper end 22a of clamp nipple 22 and in communication therewith is an elongate box nipple 40. Box nipple 40, which is externally screw threaded at each end, attaches at its lower end to the upper end of clamp nipple 20 and its upper end to electrical enclosure 18. The upper end of box nipple 40 is in communication with the interior of electrical enclosure 18 through an opening 18a in the enclosure. This allows passage of wires 11 through the conduit 16 into the interior of enclosure 18. In the present illustrative embodiment, an electrical box is shown. However, it may be appreciated that any suitable electrical enclosure is contemplated. In addition, as shown herein, the wires 11 pass straight through into the box. It is contemplated that the wires may be looped extending into the enclosure. The loop adds a temperature drop which reduces the temperature of the wires present in the conduit and enclosure.

As also shown in FIGS. 1 and 2, the exterior of box nipple 40 may be surrounded with a thermally insulative insulating member 42. Insulating member 42 is generally tubular in configuration and is designed to fit around the exterior of box nipple 40. Insulating member 42 extends from sealing assembly 26 at the IMP 12 to the bottom of the electrical enclosure 18. This helps prevent heat conduction through the box nipple itself and also helps prevent condensation from passing therealong. While a wide variety of materials may be used to form insulating member 42, in the present embodiment, insulating member 42 is formed from suitable insulating material.

Figure 7:
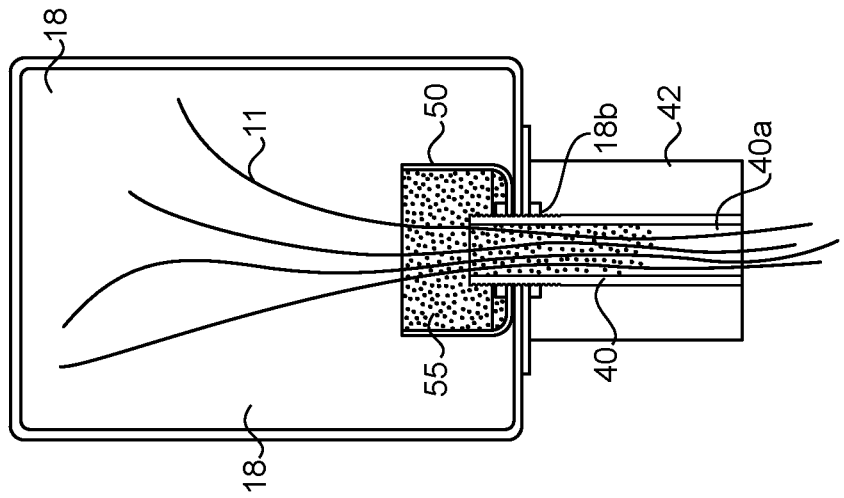
FIG. 7 shows the fill cup of FIG. 6 installed within an electrical enclosure.
Figure 6:
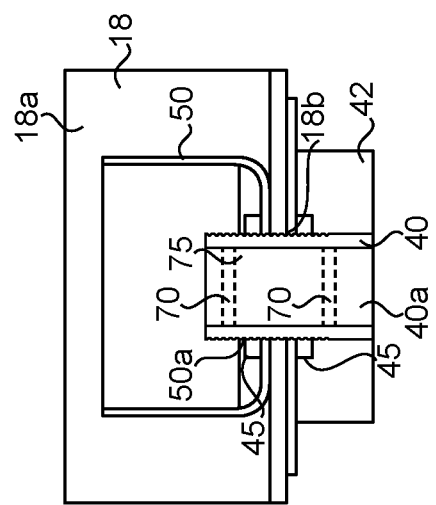
FIG. 6 is a cross-sectional showing a fill cup used in the conduit assembly of FIG. 1.

Referring now to FIGS. 6 and 7, as can be seen the upper end of box nipple 40 extends into the interior 18a of electrical enclosure 18 through the lower opening 18b. The box nipple 40 is secured to the enclosure 18 by lock nuts 45. Box nipple 40 has an interior 40a through which wires 11 pass.

In order to further prevent thermal conductivity from passing through the interior of box nipple 40 and through the opening 18b of enclosure 18. the present invention provides a fill cup surrounding opening 18b and the upper end of box nipple 40.

Fill cup 50 is an open ended cup shaped member which is designed to accommodate an injectable sealant 55. The fill cup has a lower opening 50a which resides over opening 18b in enclosure 18. As shown in FIG. 7, the sealant 55 can be injected into the fill cup 50 to fill the cup and to also extend downwardly into the interior 40a of the upper end of box nipple 40. This also provides a thermal break through the interior of box nipple 40. While a wide variety of sealants may be employed, the present invention employs a food grade sealant.

Figure 9:
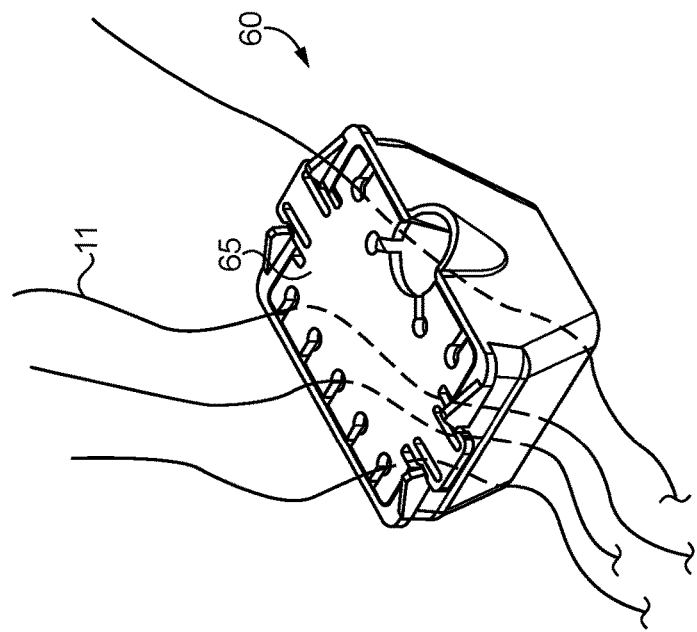
FIGS. 8 and 9 are perspective showings of an alternative embodiment of the fill cup of FIGS. 6 and 7.
Figure 8:
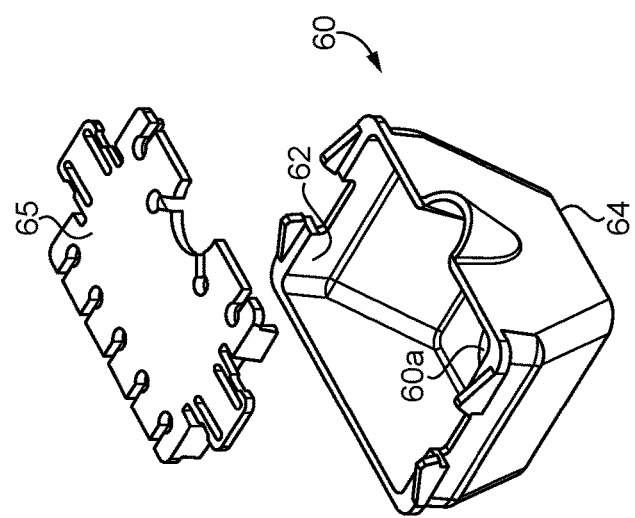

An alternate embodiment of the fill cup is shown with respect to FIGS. 8 and 9. Fill cup 60 has a generally V-shaped configuration where the open upper end 62 is wider than the lower end 64 positioned over the opening of the electrical enclosure 18. The lower end 64 has an opening 60a which resides over the opening of enclosure 18. The open upper end 62 allows the wires 11 to be splayed for easy distribution in the electrical box. A lid 65 is provided for covering the open upper end of the fill cup 60. The lid 65 has spaced apart apertures which allow for separation and passage of the wires 11 into enclosure 18.

Figure 10:
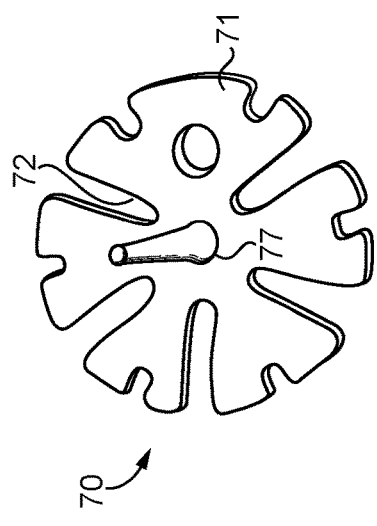
FIG. 10 is a perspective showing of a spacer used in accordance with a further embodiment of the present invention.

Referring now to FIGS. 6 and 10, an alternative to using the fill cup described above may now be shown. It is contemplated that the present invention may provide for accommodation of injectable sealant 55 in the conduit adjacent the enclosure 18 by employing a pair of spacers 70 of the type shown in FIG. 10.

Each spacer 70 is generally a disc shape member 71 having a plurality of apertures 72 therethrough to allow passage of wires 11 and sealant material thereinto. The spacers would be placed in the upper end of box nipple 40 to reside just above and below lock nuts 45. This creates a space 75 into which injectable sealant 55 may be injected. The spacer 70 may include a standoff 77 to help separate the spacers. In this embodiment, the pair of spacers 70 provide the thermal break without need to use a fill cup.

Figure 11:
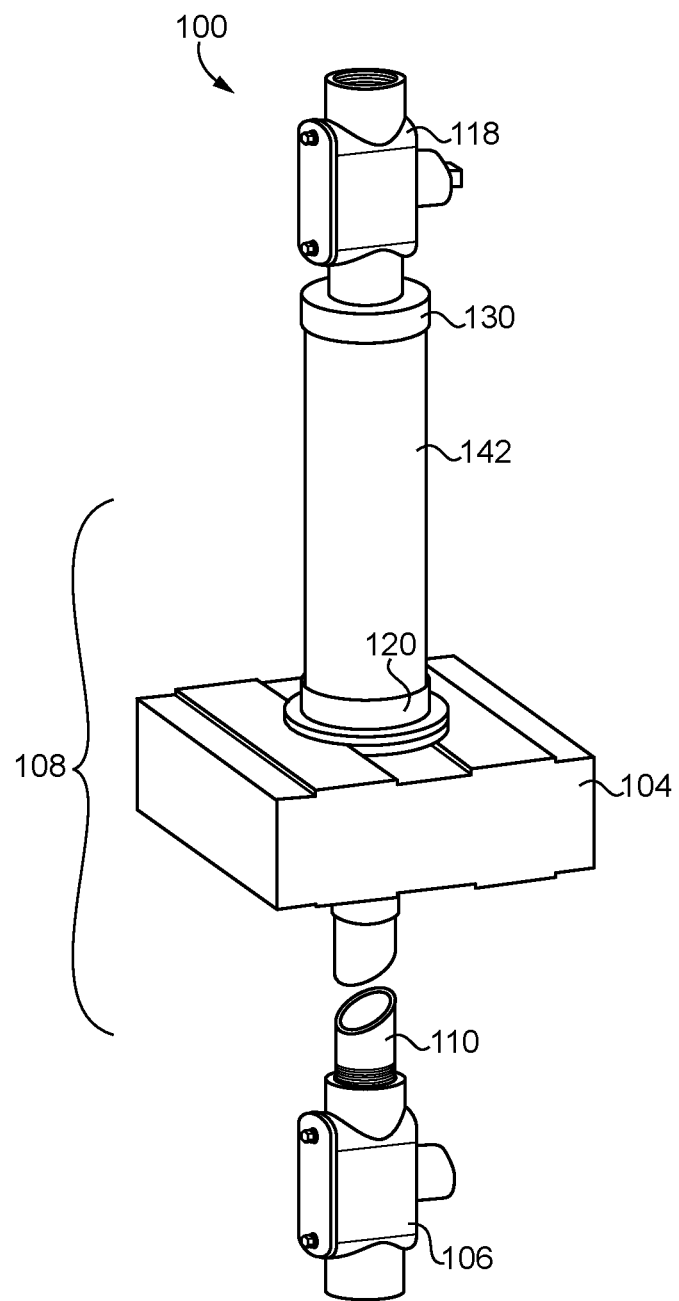
FIG. 11 is a perspective view of another embodiment of the thermal break conduit assembly.
Figure 12:
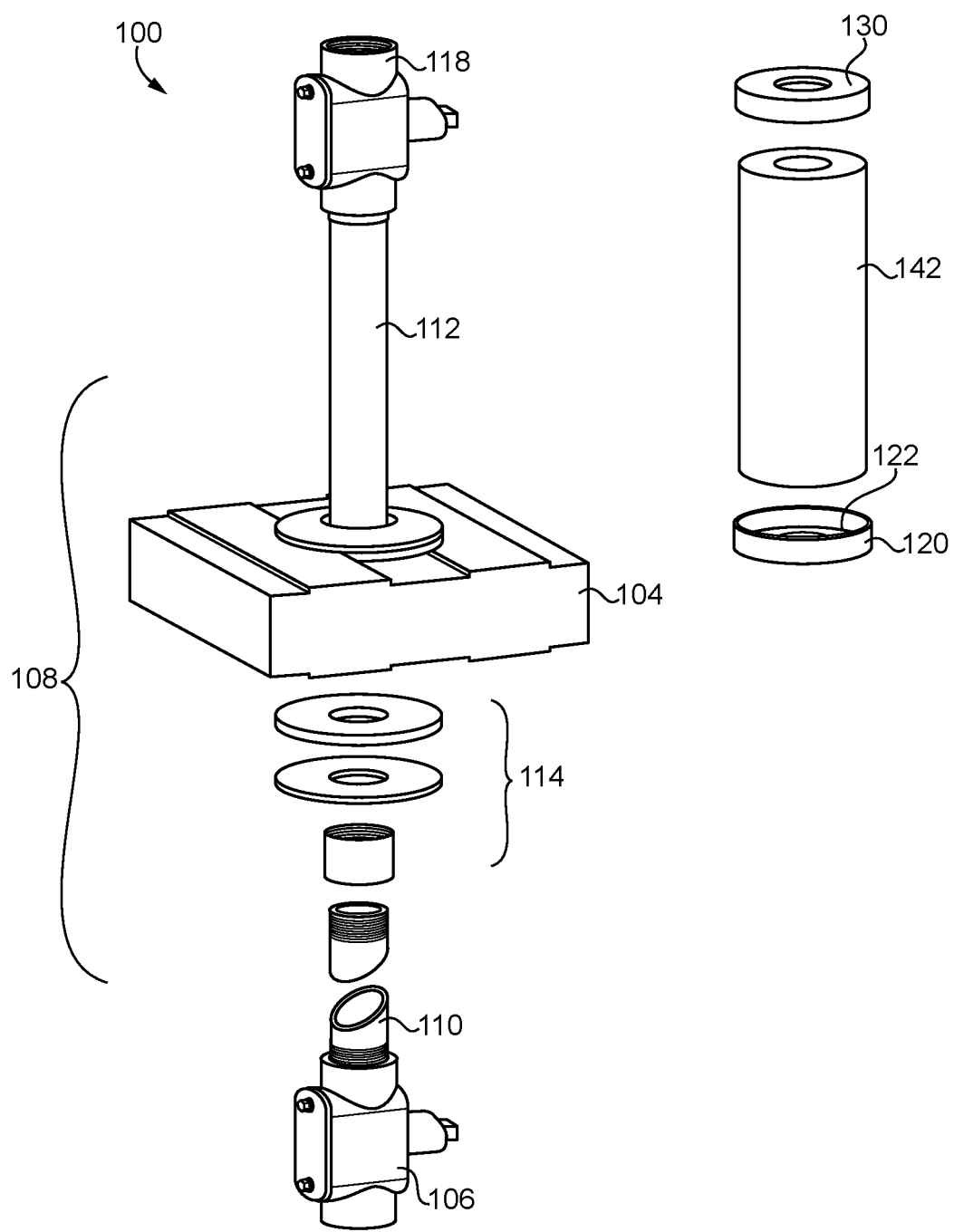
FIG. 12 is an exploded perspective view of the conduit assembly of FIG. 11.
Figure 13:
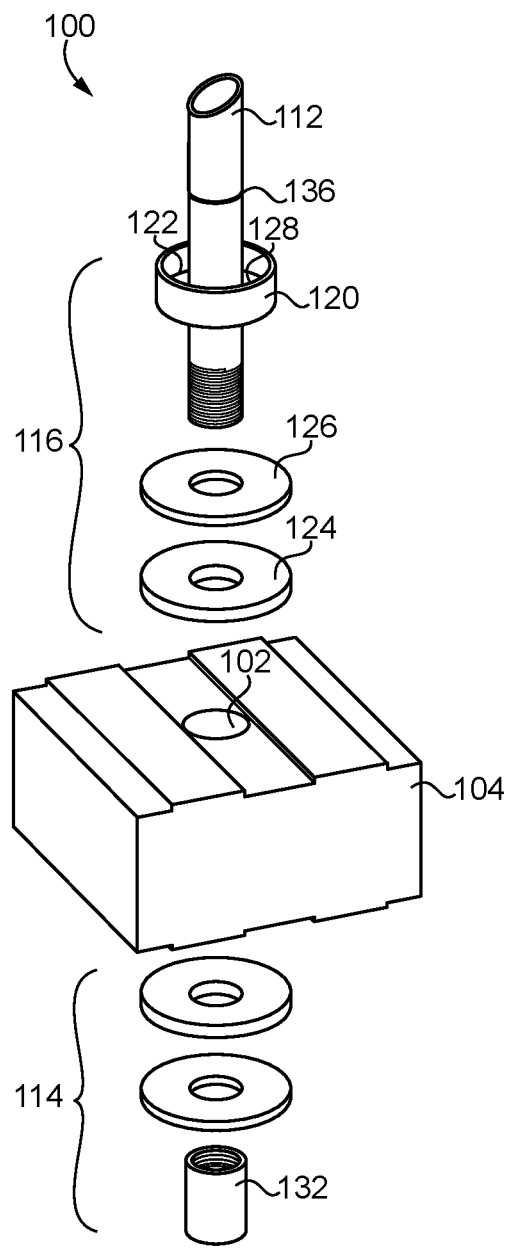
FIG. 13 is an exploded perspective view of panel seals of FIG. 11.

Referring to FIGS. 11-13, another embodiment of the present invention is shown. The conduit assembly 100, which is constructed similar to the embodiment (conduit assembly 10) described above, provides a thermal break about an opening 102 in an insulated panel 104. The conduit assembly 100 in the present embodiment includes a conduit body 106, a conduit 108 having a conduit nipple 112 and a conduit run 110 attached to the conduit body 106, a first panel seal assembly 114, a second panel seal assembly 116, and a conduit fitting 118 attached to the conduit nipple 112 of the conduit 108.

The first panel seal assembly 114 in the present embodiment includes all the components of the first panel seal assembly 24 of the embodiment described above (conduit assembly 10). The second panel seal assembly 116 in the present embodiment includes an end cap 120, with an open end 122, to compress washers 124, 126 from the end opposite the open end and seal the opening 102 of the insulated panel 104 from the ambient side. Another end cap 130 is provided and disposed at the attachment of the conduit fitting 118 and the conduit nipple 112, as shown in FIG. 11.

Figure 14:
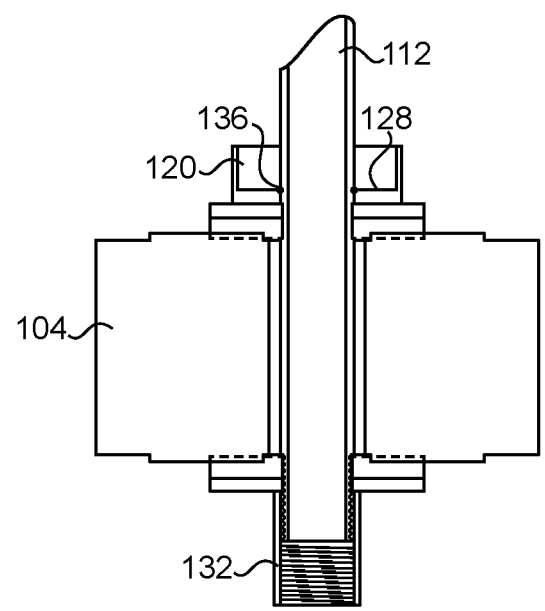
FIG. 14 is a cross-sectional showing of the panel seals of FIG. 13.

The elongate conduit nipple 112 is designed and configured to extend through the opening 102 in the insulated panel 104, thereby, allowing the elongate conduit nipple 112 to be directly attached to the pipe coupling 132 of the first panel seal assembly 114, as shown in FIG. 14.

Figure 15:
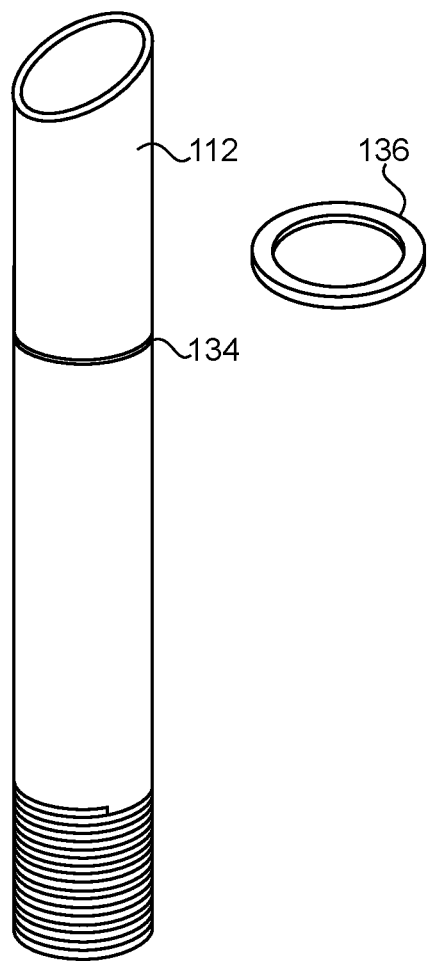
FIG. 15 is a perspective showing of a lower portion of a conduit nipple and a stop ring used in the conduit assembly of FIG. 11.

A groove 134 is defined on the outer surface in the lower portion of the conduit nipple 112, as shown in FIG. 15, for a stop ring 136 to be fixed thereon to provide a bearing surface to hold against an open end surface 128 of the end cap 120 of the second panel seal assembly 116. Specifically, an inner portion of the stop ring 136 may be disposed within the groove 134 such that an outer portion of the stop ring 136 protrudes outwardly front the outer surface of the conduit nipple 112, as shown in FIGS. 13 and 14.

Figure 16:
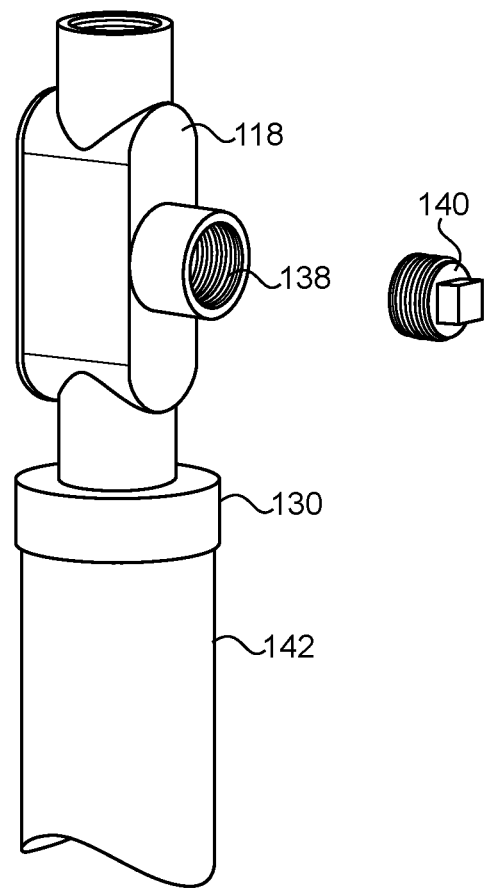
FIG. 16 is a perspective showing of a conduit fitting and a plug used in the conduit assembly of FIG. 11.

Referring to FIG. 16, the conduit fitting 118 may be threaded onto top of the elongate conduit nipple 112 for accommodating an injectable thermal sealant therewithin. Specifically, the conduit fitting 118 has a conduit fitting interior, which may be filled with the thermal sealant through a side hub 138 (threaded port) defined on the conduit fitting 118. A threaded plug 140 is provided to open/close the side hub 138 of the conduit fitting 118 by threaded detaching attaching to the side hub 138.

Similar to the embodiment (conduit assembly 10) described above, the exterior of conduit nipple 112 may be surrounded with a thermally insulative insulating member 142. The insulating member 142 may be secured onto the conduit nipple 112 by engaging each end of the insulating member 142 to the open end 122 of the respective end cap 120, 130, as shown in FIGS. 11 and 16.

While, in the depicted embodiment, the conduit fining 118 is T-shaped and the end caps 120, 130 are made of polymeric materials, other designs and materials could be used for the conduit fitting 118 and end caps 120, 130, respectively, as deemed suitable for given application factors.

Various changes to the foregoing described and shown structures would now be evident to those skilled in the art. Accordingly, the particularly disclosed scope of the invention is set forth in the following claims.

What is claimed is:

1. A conduit assembly for providing a thermal break about an opening in an insulated panel through which the conduit assembly extends, comprising:
    an elongate conduit extending through said opening in said panel, said conduit having an interior for passage of wires and an exterior;
    an electrical enclosure mounted to a first end of said conduit on a first side of said panel, said conduit and said enclosure being in communication for passage of said wires into said ends; and
    a panel seal attachable to and supported by said conduit for sealing said opening on a second side of said panel about said conduit;
    wherein said conduit further comprises an external screw thread on a second end;
    wherein said panel seal further includes:
        a first sealing washer disposed about said conduit on said second side of said panel at said panel opening; and
        a first coupling having internal threads configured to be reciprocally threaded with said external screw thread at said second end of said conduit to maintain said first sealing washer in sealed engagement with said panel about said conduit.

2. The conduit assembly of claim 1, further including a fill cup supported in said electrical enclosure about an enclosure opening in communication with said conduit, said fill cup accommodating passage of said wires into said enclosure; and
    a thermal sealant injectable into said fill cup for surrounding said wires and for extending into said conduit interior adjacent said fill cup.

3. The conduit assembly of claim 2, further including a lid for covering said fill cup, said lid having spaced apart apertures for separating and allowing passage of said wires into said electrical enclosure.

4. The conduit assembly of claim 1, wherein said panel seal further includes:
    a second sealing washer disposed about said conduit on said first side of said panel at said panel opening and a second coupling to maintain said second sealing washer in sealed engagement with said first side of said panel about said conduit.

5. The conduit assembly of claim 4, wherein said first and second couplings each include a back-up washer to fix said first and said second washers against said panel.

6. The conduit assembly of claim 4 wherein said first and second sealing washers are formed of a material having a thickness and durometer sufficient to allow a fixed amount of movement along the conduit.

7. The conduit assembly of claim 1, wherein the conduit includes a conduit nipple, said conduit nipple extending through said opening in said panel.

8. The conduit assembly of claim 7 further including a conduit insulator surrounding said conduit nipple between said panel and said enclosure.

9. The conduit assembly of claim 1, wherein the conduit further includes a box nipple extending from said conduit to said enclosure.

10. The conduit assembly of claim 9, wherein said box nipple is formed from non-thermally conductive material.

11. The conduit assembly of claim 1 wherein said electrical enclosure is an electrical box.

12. The conduit assembly of claim 1 wherein a pair of spacers are positioned in spaced apart relationship within said conduit adjacent said one end thereof;
    a thermal sealant injectable into said conduit between said spacers.

13. A conduit assembly for providing a thermal break about an opening in an insulated panel through which the conduit assembly extends, comprising:
    an elongate conduit extending through said opening in said panel, said conduit having a conduit interior for passage of wires and an exterior;
    a conduit fitting having a conduit fitting interior, said conduit fitting mounted to a second end of said conduit on a second side of said panel, said conduit and said conduit fitting being in communication for passage of said wires into said ends; and
    a panel seal attachable to and supported by said conduit for sealing said opening on said second side of said panel about said conduit;
    wherein said conduit further comprises an external screw thread on said second end;
    wherein said panel further includes:
        a first sealing washer disposed about said conduit on said second side of said panel at said panel opening; and
        a first coupling having internal threads configured to be reciprocally threaded with said external screw thread at said second end of said conduit to maintain said first sealing washer in sealed engagement with said panel about said conduit.

14. The conduit assembly of claim 13, further including a thermal sealant injectable into said conduit fitting for surrounding said wires and for extending into said conduit interior adjacent said conduit fitting.

15. The conduit assembly of claim 14, wherein a side hub is defined on said conduit fitting such that said sealant is injected into said conduit fitting interior via said side hub.

16. The conduit assembly of claim 13, wherein said panel seal further includes:
    a second sealing washer disposed about said conduit on a first side of said panel at said panel opening and an end cap to maintain said second sealing washer in sealed engagement with said panel about said conduit.

17. The conduit assembly of claim 13, wherein the conduit includes a conduit nipple, said conduit nipple having a groove defined on an outer surface of said conduit nipple and extending through said opening in said panel and attaching to the first coupling.

18. The conduit assembly of claim 17, further including a stop ring, said stop ring configured such that, when said stop ring is fixed onto said conduit nipple, an inner portion of said stop ring is placed within said groove and an outer portion of said stop ring protrudes outwardly from said outer surface of said conduit nipple.

* * * * *